US011601602B2

(12) United States Patent
Sheinin et al.

(10) Patent No.: US 11,601,602 B2
(45) Date of Patent: Mar. 7, 2023

(54) COMPUTATIONAL IMAGING OF THE ELECTRIC GRID

(71) Applicants: TECHNION RESEARCH & DEVELOPMENT FOUNDATION LIMITED, Haifa (IL); THE GOVERNING COUNCIL OF THE UNIVERSITY OF TORONTO, Toronto (CA)

(72) Inventors: Mark Sheinin, Haifa (IL); Yoav Schechner, Haifa (IL); Yoash Levron, Moshav Ein-Eiron (IL); Kiriakos Neoklis Kutulakos, Toronto (CA)

(73) Assignees: TECHNION RESEARCH & DEVELOPMENT FOUNDATION LIMITED, Haifa (IL); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 17/254,384

(22) PCT Filed: Jun. 20, 2019

(86) PCT No.: PCT/IL2019/050695
§ 371 (c)(1),
(2) Date: Dec. 21, 2020

(87) PCT Pub. No.: WO2019/244158
PCT Pub. Date: Dec. 26, 2019

(65) Prior Publication Data
US 2021/0274085 A1 Sep. 2, 2021

Related U.S. Application Data

(60) Provisional application No. 62/687,326, filed on Jun. 20, 2018.

(51) Int. Cl.
*H04N 5/235* (2006.01)
*G03B 7/093* (2021.01)
*H04N 5/225* (2006.01)

(52) U.S. Cl.
CPC .......... *H04N 5/2357* (2013.01); *G03B 7/093* (2013.01); *H04N 5/2256* (2013.01)

(58) Field of Classification Search
CPC ..... H04N 5/2357; H04N 5/2256; G03B 7/093
See application file for complete search history.

(56) References Cited

U.S. PATENT DOCUMENTS 7,359,564 B2  4/2008  Keam et al.
8,248,467 B1  8/2012  Ganick et al.
(Continued)

FOREIGN PATENT DOCUMENTS

WO  WO-2011053678 A1 *  5/2011  ............. G06T 5/003
WO  2018211511 A1  11/2018

OTHER PUBLICATIONS

M. Sheinin, Y. Y. Schechner, K. N. Kutulakos, "Computational imaging on the electric grid," Proc. IEEE CVPR (2017), Date of Conference: Jul. 21-26, 2017.
(Continued)

*Primary Examiner* — Twyler L Haskins
*Assistant Examiner* — Angel L Garces-Rivera
(74) *Attorney, Agent, or Firm* — The Roy Gross Law Firm, LLC; Roy Gross

(57) ABSTRACT

A method comprising receiving data representing light intensity values corresponding to a flicker pattern of a reference light source powered by an alternating current (AC); operating a controllable illumination source, based, at least in part, on said data; capturing, using an imaging device, a sequence of images of a scene illuminated, at least in part, by said controllable illumination source; estimating
(Continued)

an intensity value for at least one pixel in said array, correspondingly in each of said images in said sequence of images; and determining a temporal point in said flicker pattern of said reference light source, based, at least in part, on said estimating.

19 Claims, 6 Drawing Sheets

(56) References Cited

U.S. PATENT DOCUMENTS

| | | | |
|---|---|---|---|
| 8,334,901 | B1 | 12/2012 | Ganick et al. |
| 8,866,391 | B2 | 10/2014 | Ganick et al. |
| 9,509,886 | B2 | 11/2016 | Sorkine Hornung et al. |
| 2008/0278603 | A1* | 11/2008 | Lee ................... H04N 5/3532 348/E5.037 |
| 2009/0315566 | A1 | 12/2009 | Thiim |
| 2014/0313401 | A1* | 10/2014 | Rihn ................... H04N 5/2354 348/371 |

OTHER PUBLICATIONS

Sheinin, M. (Jun. 12, 2018). AC flicker sensor, repeater and trigger [Video]. Google Photos. https://photos.google.com/share/AF1QipN9SB00qabzuYHiinfloN6fPrmxcA53aLeyz_jWL-hlHdXnlmMW8Xj369opfxpjjg?key=M05xbnl1dHBRTzJJSFREUGtDZGFSb0VsN21fd3ln <accessed Jul. 28, 2022>.

* cited by examiner

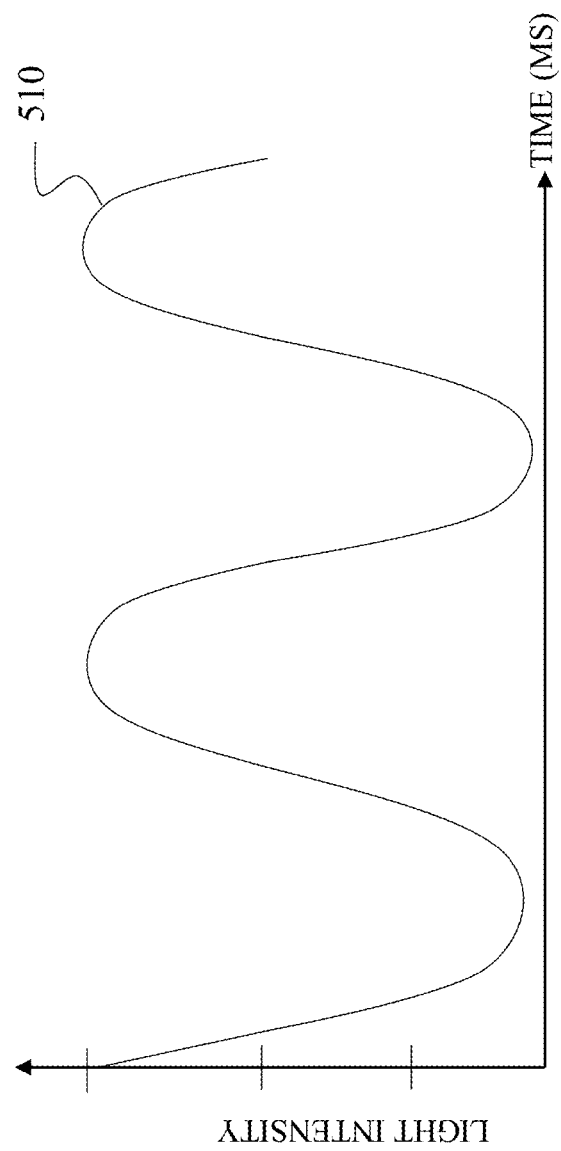

COMPUTATIONAL IMAGING OF THE ELECTRIC GRID

CROSS REFERENCE TO RELATED APPLICATIONS

This application is a National Phase of PCT Patent Application No. PCT/IL2019/050695 having International filing date of Jun. 20, 2019, which claims the benefit of priority of U.S. Provisional Patent Application No. 62/687,326, filed Jun. 20, 2018, the contents of which are all incorporated herein by reference in their entirety.

FIELD OF INVENTION

The present invention is in the field of computer imaging.

BACKGROUND OF THE INVENTION

Power plants supply the city's electrical needs using alternating current (AC) power transmission. In AC power transmission, electrical energy is distributed by generating an AC voltage waveform (usually a sine wave) with a frequency of 50 or 60 Hz. This waveform is then distributed over the city's grid via power lines. In some cases, the power plant generates three sine waves (three phases), with phases spread apart by 120°. On a city scale, power transformers introduce additional phase shifts to these three phases. Each power consumer within the city, from streetlamps to household power outlets, connects to one of these three phases, arbitrarily.

Light sources connected to the power grid change their intensity and spectral power distribution in response to the grid's alternating current, however, that flicker pattern is usually too subtle and too fast to notice with the naked eye. Artificial lighting produces unnatural-looking colors in photos and temporal aliasing in video. A method of harnessing this AC-induced lighting variation as a way of gaining information about the electrical grid is greatly needed.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a system comprising an imaging device comprising a light sensing element comprising an array of pixels; a controllable illumination source; at least one hardware processor; and a non-transitory computer-readable storage medium having stored thereon program instructions, the program instructions executable by the at least one hardware processor to: receive data representing light intensity values corresponding to a flicker pattern of a reference light source powered by an alternating current (AC), operate said controllable illumination source, based, at least in part, on said data, capture, using said imaging device, a sequence of images of a scene illuminated, at least in part, by said controllable illumination source, estimate an intensity value for at least one pixel in said array, correspondingly in each of said images in said sequence of images, and determine one or more characteristics of said AC, based, at least in part, on said estimating.

There is also provided, in an embodiment, a method comprising operating at least one hardware processor for: receiving data representing light intensity values corresponding to a flicker pattern of a reference light source powered by an alternating current (AC), operating a controllable illumination source, based, at least in part, on said data, operating an imaging device to capture a sequence of images of a scene illuminated, at least in part, by said controllable illumination source, estimating an intensity value for at least one pixel in said array, correspondingly in each of said images in said sequence of images, and determining one or more characteristics of said AC, based, at least in part, on said estimating.

There is further provided, in an embodiment, a computer program product comprising a non-transitory computer-readable storage medium having program instructions embodied therewith, the program instructions executable by at least one hardware processor to: receive data representing light intensity values corresponding to a flicker pattern of a reference light source powered by an alternating current (AC); operate a controllable illumination source, based, at least in part, on said data; operate an imaging device to capture a sequence of images of a scene illuminated, at least in part, by said controllable illumination source; estimate an intensity value for at least one pixel in said array, correspondingly in each of said images in said sequence of images; and determine one or more characteristics of said AC, based, at least in part, on said estimating.

In some embodiments, said one or more characteristics are selected from the group consisting of: a temporal point in said flicker pattern of said reference light source, a phase of said AC, phase changes of said AC, frequency fluctuations of said AC, amplitude of said AC, amplitude fluctuations of said AC, and nonlinearities in said AC.

In some embodiments, said data represents instantaneous light intensity values of said flicker pattern of said reference light source.

In some embodiments, said data replicates a waveform of said flicker pattern of said reference light source.

In some embodiments, said estimating further comprises calculating relative temporal differences in said estimated intensity values of said at least one pixel in said sequence of images.

In some embodiments, said scene is located outside a direct illumination area of said reference light source.

In some embodiments, said data is received from a light sensor configured to (i) sample a light flux from said reference light source, and (ii) convert said sampled light flux into said data.

In some embodiments, said light sensor further comprises an optical module located in the optical path between said light sensor and said reference light source, wherein said optical module is configured to perform at least one of: amplify said light flux, focus said light flux, and direct said light flux.

In some embodiments, said at least one pixel corresponds to a location within a diffuse surface in said scene.

In some embodiments, said imaging device further comprises a mask configured to expose said scene to said light sensing element in a spatially varying manner.

In some embodiments, said mask is a rolling shutter configured to expose rows of said light sensing element in a sequential manner; and said at least one pixel comprises a vertical or horizontal sequence of pixels.

In some embodiments, said mask is configured to expose regions of said light sensing element in a random manner.

In some embodiments, said determining comprises detecting a phase of said AC current powering said reference light source.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

FIG. 5A shows a graph depicting an output signal of a light sensor sampling a light intensity corresponding to a flicker pattern off a reference light source, wherein the output replicates the flicker pattern, according to exemplary embodiments of the present invention.

DETAILED DESCRIPTION

Figure 1:
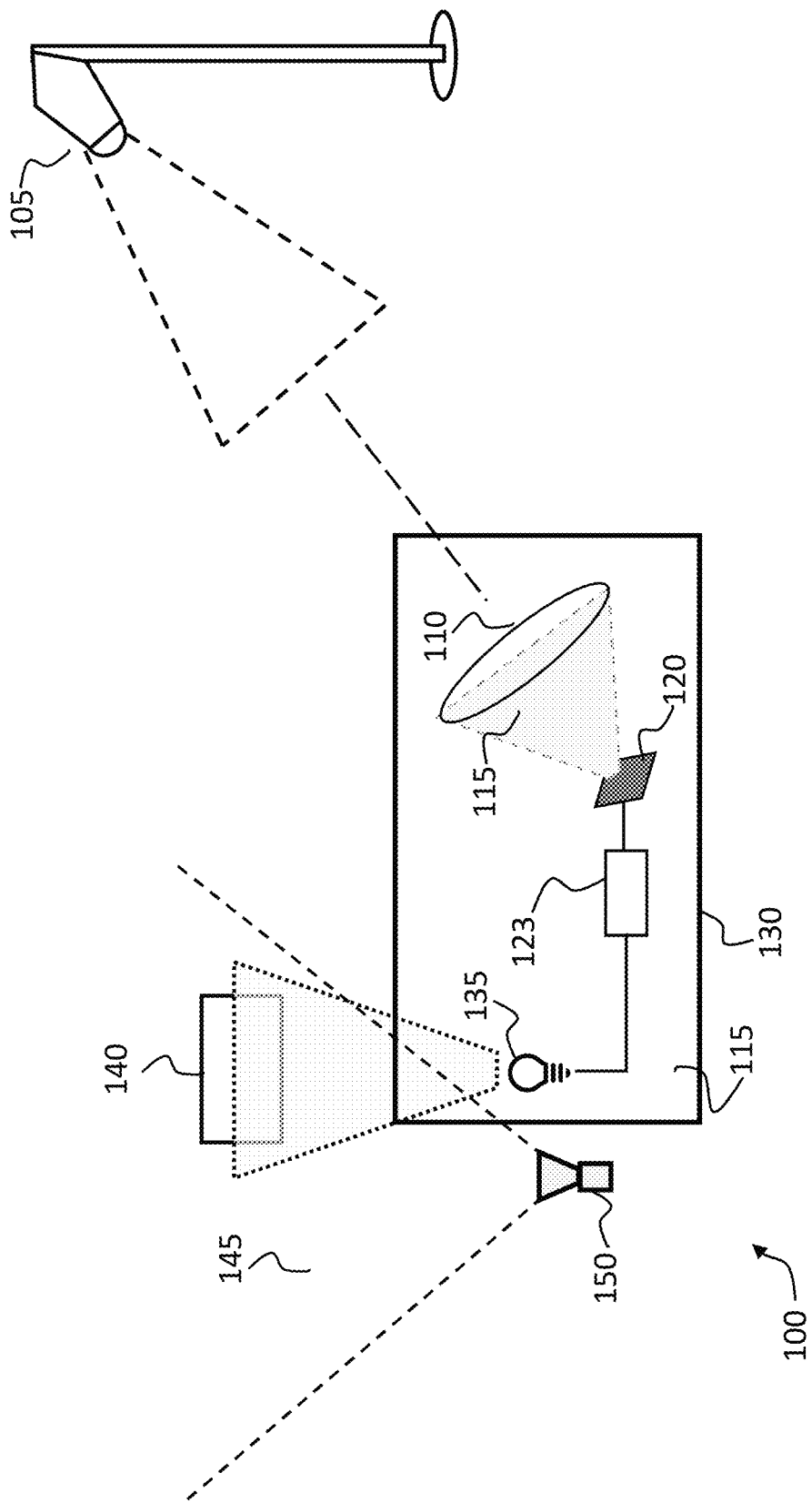
FIG. 1 illustrates a computing system comprising a sensing device, a repeating module and an imaging device, in accordance with exemplary embodiments of the present invention.

The present invention, in some embodiments, provides a system and method for probing AC-powered light, to detect one or more AC grid characteristics. In some embodiments, such AC grid characteristics may include AC phase, phase changes, frequency fluctuations, amplitude, amplitude fluctuations, nonlinearities, and the like.

In some embodiments, the detection of the AC grid characteristics is based, at least in part, on detecting a flicker pattern cycle of a reference light powered by the grid. In some embodiments, the detected flicker pattern is converted into a data signal, wherein the signal may be used for, e.g., directly recording a timing of the AC cycle, activating a camera to capture images in synchrony with the AC cycle, and/or controlling the output of a repeater light bulb which may be configured to be operated according to the data signal, e.g., to repeat a representation of the flicker pattern of the remote reference light source, e.g., at a local scene.

In some embodiments, imaging such a remote scene illuminated by a repeated replication of the reference light may be used for, e.g., recording the AC-flicker cycle timing and other parameters and/or characteristics of the AC current. In some embodiments, such imaging may be configured for extracting a canonical time signal (i.e., time relative to the AC cycle; see, e.g., M. Sheinin, Y. Y. Schechner, K. N. Kutulakos, "Rollin g shutter imaging on the electric grid," Proc. IEEE ICCP (2018)).

In some embodiments, the imaging comprises capturing a sequence of images of the scene or a specified portion thereof, by an imaging device.

In some embodiments, the imaging device is equipped with, e.g., a shutter and/or a mask interposed between the scene and an image sensor of the imaging device, wherein the mask controls the exposure of one or more of light-sensing elements of the image sensor to light from the scene. In some embodiments, the mask and/or shutter are configured to expose the light sensing array in a spatially varying manner. In some embodiments, the mask is, e.g., a rolling shutter configured to expose rows of the image sensor in a sequential manner. In some embodiments, the mask is configured to expose regions of the image sensor in a random manner or non-periodic manner.

In some embodiments, the imaging device is equipped with a rolling shutter, wherein each image in the sequence captures a consecutive portion of the scene in, e.g., a vertical or horizontal scanning order. In some embodiments, the imaging device can be configured to capture a vertical or horizontal sequence of pixels in the sequence of images. In some cases, the pixel sequences can be, e.g., a row of pixels captured during an exposure of an imaging sensor of the imaging device to the image, wherein the exposure can be controlled by the rolling shutter.

In some cases, the imaging device is configured to capture light reflected from a diffuse surface in the scene. In some cases, the diffuse surface can be positioned to reflect the illumination such that, at least a part of the reflected light can be captured by the imaging device. In some cases, diffuse surface can be a wall, or a screen designed and configured to reflect light towards the imaging device.

In some embodiments, detecting parameters and/or characteristics of the AC current is based, at least in part, on estimated pixel intensity values in the sequence of images. For example, in some embodiments, the estimated pixel intensity values can be estimated to determine a temporal point in the AC flicker cycle in which each of the images was captured. Such a determination can be accomplished by comparing the relative estimated pixel intensity values I the sequence of images.

In some embodiments, the illumination of the local scene can be generated by a repeating module configured to replicate a flicker pattern of a remote reference light comprising a combination of hardware, software, and a light source designed to illuminate the diffuse surface in a cyclic manner, wherein the cycles correspond to a frequency of the AC current. For example, the repeating module can generate illumination in illumination frequencies corresponding to a frequency of the AC current.

In some embodiments of the present invention, a system such as system 100 can be configured to communicate with a sensing device comprising a combination of hardware, software, and at least one light sensor designed to sense an illumination of a light source. The sensing device can be configured to sense sequences of illuminations of an AC powered light source, denoted herein as a reference light source. The sensing device can also sense the illuminations of the reference light source during the AC flicker cycles of an AC grid. In some cases, the sensing device can also be configured to convert the sensed illuminations of the reference light source to a data, e.g., digital data, representing the AC flicker cycle, or AC flicker cycles. In some cases, such a data can be sent by the sensing device to the remote repeating module.

In some embodiment, the repeating module can be configured to receive data representing light intensity corresponding to flicker cycles of the AC powered light, wherein in some cases, such data may be obtained from a sensing device. The remote repeating module can be configured to receive the data and illuminate a scene by a light source. Such illumination can be in flicker cycles, wherein the flicker cycle corresponds to a frequency of the AC current.

In some embodiments, a light source controlled by a repeating module can illuminate part of the field of view of an imaging device. In such a case, the imaging device's respective field of view can function as a recorder of a scene illuminated by the repeating module in flicker cycles. In some cases, the recording of the imaging device can comprise timing, time samples, frequency rates, and other parameters of the flicker cycles, according to the captured images. In some cases, the flicker cycles of the scene illumination can be generated by the repeating module according to the data comprising parameters of the AC flicker cycle. Such data can be received from the sensing device to the repeating module.

In some embodiments, the data is an output signal representing light intensity values corresponding to a flicker pattern of the reference light source, wherein the output replicates a waveform of the flicker pattern. In some embodiments, the output signal represents instantaneous light intensity values of the flicker cycle of the reference light source. For example, the maximum and minimum values can be provided in a rectangular or Bocxar function, or any other mathematical function utilized for the purpose of transferring maximum and minimum values. In some cases, the data can comprise additional parameters and/or information. For example, the data can comprise a normalizing constant for normalizing the data.

Figure 5B:
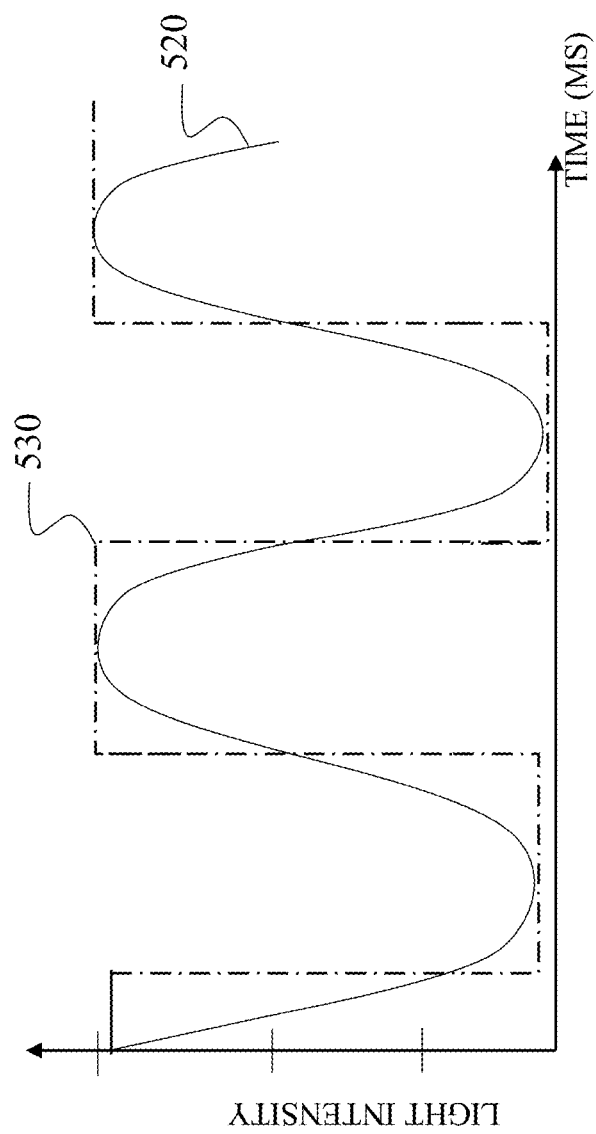
FIG. 5B shows a graph depicting an output signal of a light sensor sampling a light intensity corresponding to a flicker pattern off a reference light source, wherein the output represents instantaneous light intensity values of said flicker cycle of said reference light source, according to exemplary embodiments of the present invention.

In some cases, such parameters can be utilized by the repeating module for generate a sine waveform according to the minimum and maximum values of the reference light intensity as captured by the sensing device. (FIG. 5B, sine waveform 520).

In some embodiments, the repeating module can operate the controllable illumination source to encode the parameters and the values received in the data. In some cases, the repeating module can utilize the controllable illumination source to project light on the diffuse surface, wherein the repeating module encodes the AC flicker according to the received data through flickering the controllable illumination source.

Further provided herein, in accordance with some embodiments, is a method comprising: receiving data representing light intensity which corresponds to an AC flicker cycle of a reference light source by a repeating module, illuminating a scene with illumination in AC flicker cycles corresponding to received AC flicker cycle, operating a rolling shutter and imaging sensor to capture one or more images of a scene, estimating pixel intensity values for each of the captured images to identify the points in the cycle in which each of the images was captured, and identifying a specific phase of the AC current which powers the reference light source.

In some embodiments of the present invention, the systems and methods disclosed herein can be operated to utilize the pixel intensity values and the identification of the points in the cycle in which each of the images was captured to define the waveform of the AC current which powers the reference light source.

As used herein, the term "waveform" refers to a signal shape as a function of time. In some cases, the waveform of an electrical signal can be visualized in an oscilloscope or any other device that can capture and plot its value at various times, with a suitable scale in the time and value axes. A signal can be repeating or non-repeating electronic signals in either the analog or the digital domain. In some cases, a waveform can depict a signal produced by an electric grid. In such cases, the electric grid can be a grid of a city in which the signal is detected, e.g., by detecting a current outlet, and the cycle of the waveform depicts the cycle of alternate current (AC) in the electric grid.

In some embodiments, the present disclosure employs systems and/or methods disclosed by the present inventors in:
 (i) International Patent Application No. PCT/IL2018/050539, filed May 16, 2018, claiming the benefit of priority of:
    a. U.S. Provisional Patent Application No. 62/506,678, filed May 16, 2017, entitled "Computational Imaging on the Electric Grid",
    b. U.S. Provisional Patent Application No. 62/608,086, filed Dec. 20, 2017, entitled "Rolling Shutter Imaging on the Electric Grid", and
    c. U.S. Provisional Patent Application No. 62/664,199, filed Apr. 29, 2018, entitled "Rolling Shutter Imaging on the Electric Grid"; as well as in
 (ii) M. Sheinin, Y. Y. Schechner, K. N. Kutulakos, "Computational imaging on the electric grid," Proc. IEEE CVPR (2017), and
 (iii) M. Sheinin, Y. Y. Schechner, K. N. Kutulakos, "Rolling shutter imaging on the electric grid," Proc. IEEE ICCP (2018),
the contents of all of which are incorporated herein by reference in their entirety.

AC Power Source Characteristics

A power source characterized by alternate current power can be described by a model of AC-modulated lighting. Suppliers of power sources strive for a zero-mean sinusoidal AC voltage having a regular peak outlet amplitude $V_{max}$. Depending on the country, $V_{max}$ is 170 or 312 zero-to-peak Volts, yielding a root-mean-squared voltage of 120 or 220 Volts, respectively.

Imperfections in electricity generation slightly wiggle the AC frequency randomly. Hence, the AC is quasi periodic: for a short time span, the effective frequency is a perturbation of the nominal frequency. The wiggle is practically spatially invariant in spatiotemporal scales typical to computer vision: the temporary frequency of the AC is essentially the same in any electrical outlet across the city. The reason is that electricity perturbations propagate at a speed on the order of the speed of light.

In practice, the temporary frequency of the AC is determined from the time interval $\Delta$ between two successive zero crossings. Since there are two such crossings per period of the AC, its frequency is given by $$f = 1/(2\Delta).$$

The electric grid carries AC in a discrete set $\mathbb{P}$ of grid phases. In most scenes, there are three such waveforms spaced, e.g., $2\pi/3$ apart. Each outlet can be connected to one of these grid phases. In such cases, the phase can be a periodic function depicting the amplitude span of a full period of a wave cycle, depending on time. Thus, the phase can yield the waveforms of the alternating current.

AC-Powered Lights

A bulb $\beta$ is a system whose input is the voltage V(t), and its output is spectral flux $L_\beta(t,\lambda)$, where $\lambda$ denotes wavelength. In a bulb which is electrically linear, i.e., where the current J(t) satisfies a proportionality $J(t) \propto V(t)$, and is unmediated, i.e., it converts electric power $J(t)V(t) \propto V^2(t)$ to flux directly and instantaneously, the spectral flux $L_\beta(t,\lambda)$ is equivalent to $V^2(t)$. Consequently, this bulb flickers at double the AC frequency, and becomes dark whenever V(t) goes to zero. This flickering period is a cycle having a duration of $\Delta$.

In practice, the transition from electricity to radiance is mediated by various mechanisms. Optical mediators include heat, gas discharge and phosphorescence. Non-incandescent bulbs generally have electronic components inside the bulb fixture, to which the lay person is oblivious. These components (diodes, inductors, etc.) mediate between voltage and spectral flux. Mediators have response times and nonlinearities. Hence the function $L_\beta(t,\lambda)$ is a distortion of $V^2(t)$: there is a delay, and $L_\beta(t,\lambda)$ generally does not go to zero during a cycle.

Denote by $\mathbb{B}$ the finite set of bulbs in use. Consider a bulb $\beta \in \mathbb{B}$, such as a particular fluorescent bulb in a brand fixture, whose time-averaged spectral flux over one cycle is $\overline{L_\beta}(\lambda)$. Relative to this average, at time t the bulb emission fluctuates as:

$$L_\beta(t,\lambda) = \overline{L_\beta}(\lambda) B_\beta(t,\lambda).$$

The unit-less function $B_\beta(t,\lambda)$ may be defined, as to be the spectral bulb response function (SBRF). This function has a time average of 1 for each wavelength and serves as an intrinsic model of a bulb's temporal behavior.

Acquiring a lamp's SBRF requires specialized equipment like integrating spheres and high-speed spectrometers. As such, measuring the SBRF directly is rather involved. A more practical model of bulb behavior is to consider the time-varying measurements from a camera or photodiode placed nearby (with or without color filters):

$$I_\beta(t,\sigma) = \overline{I_\beta}(\sigma) B_\beta^*(t,\sigma).$$

Here $I_\beta(t,\sigma)$ is the intensity measured at a pixel or photodiode at time t and spectral band $\sigma$, $\overline{I_\beta}(\sigma)$ is its temporal average and $B_\beta^*(t,\sigma)$ is the unit-less bulb response function (BRF).

Unlike the SBRF, the BRF depends on the placement and spectral sensitivity of the device used. Specifically, the spectral flux and measured intensity are related by the integral $I_\beta(t,\sigma) = G\int L_\beta(t,\lambda) R(\sigma,\pi) d\lambda$ where $R(\sigma,\lambda)$ is the sensor's spectral sensitivity. The geometric factor G converts emitted flux to pixel/photodiode intensity and depends on their placement, aperture, etc.

In general, both the SBRF and the BRF may exhibit a slightly different temporal profile across cycles (e.g., due to voltage polarity, warm-up period, ambient temperature, etc.) These secondary effects may be ignored, however, for the sake of simplicity, treating BRFs as essentially invariant to the number of cycles since time zero. Thus, the BRFs are fully specified by their values in very first cycle. In the following t may be restricted to lie in the interval $[0, \Delta]$, and the BRF is treated as a function that is defined over just that interval.

Cameras and photodiodes provide discrete samples of the continuous intensity $I_\beta(t,\sigma)$. Suppose $I_\beta(t,\sigma)$ is resolved into K samples within a cycle. These samples correspond to integrals of $I_\beta(t,\sigma)$ over consecutive time intervals of duration $\Delta/K$. Thus:

$$i_\beta(\sigma) = \overline{I_\beta}(\sigma) b_\beta(\sigma) = \underbrace{\left(\sum_\sigma \overline{I_\beta}(\sigma)\right)}_{brightness} \underbrace{\frac{\overline{I_\beta}(\sigma)}{\sum_\sigma \overline{I_\beta}(\sigma)}}_{chromaticity\ Q_\beta(\sigma)} \underbrace{b_\beta(\sigma)}_{BRF},$$

where the K-dimensional row vectors $i_\beta(\sigma)$ and $b_\beta(\sigma)$ hold the intensity and BRF samples, respectively.

Exemplary System

FIG. 1 illustrates an exemplary system 100 for probing an AC-powered light to identify a phase of the AC current powering the light, in accordance with some embodiments of the present invention. In some embodiments, system 100 comprises an imaging device 150 and a repeating module 130. In some embodiments, system 100 may be configured to capture a light emission or flux from a remote reference light source 105, and employ a repeating module 130 to process the light flux into data to extract one or more relevant AC grid parameters and/or characteristics, and/or replicate locally a flicker pattern of the remote light source 105, to illuminate a local scene. The reference light source 105 can be, e.g., any light source, such as a street-light connected to a power grid, a light bulb located indoors, a projector located outdoors, and the like.

In some embodiments, system 100 may then be configured to capture a sequence of images of the local scene using imaging device 150. In some embodiments, repeating module 130 may be positioned to illuminate a diffuse surface within the local scene, e.g., diffuse surface 140, wherein diffuse surface 140 is located within the field of view 145 of imaging device 150.

In some embodiments, repeating module 130 may comprise at least one of an optical module 110, a sensing device 120, a controller 123, and a controllable illumination source 135.

In some embodiments of the present invention, optical module 110 may be used to capture and amplify, direct, and/or focus a light emission or flux from remote light source 105. In some embodiments, optical module 110 may be positioned and/or oriented such that the captured and/or amplified light flux is directed at sensing device 120. In some cases, the optical module 110 may comprise one or a group of lenses designed to amplify, direct, and/or focus the light flux.

In some embodiments of the present invention, the sensing device 120 may comprise an electric circuit designed to capture a light flux directed from optical module 110, and convert the captured flux into data, e.g., digital data, representing the light flux of reference light source 105. For example, the sensing device 120 may comprise an image sensor, e.g., a photosensitive cell array designed to transduce optical image of objects formed on the photosensitive cell array by incidence of light, into corresponding electronic signals, denoted herein as a captured image, representing the image captured by the image sensor. In some cases, the image sensor 120 can be configured to be individually or jointly masked and unmasked faster than the AC flicker cycle rate. The masks can define which pixels are masked at any given interval of a total exposure time.

For example, the image sensor may be Charged Coupled Devices (CCDs) or Complementary Metal Oxide Semiconductor (CMOS) image sensors, or other suitable devices comprising a light sensitive surface usable for capturing an image. In some embodiments of the present invention, a sensor such as a Charge Coupled Device (CCD) or a Complementary Metal Oxide Semiconductor (CMOS) image sensor (for detecting the reflected light received by an optical element), is employed.

The illumination 115 which focuses by the optical module 110 can be illuminated by the reference light source 105 which can be powered by an AC power grid, or a power source characterized by alternate current power.

In some embodiments, the sensing device 120 is connected to a controller 123 configured for receiving the data from sensing device 120 and converting it into a voltage signal configured to operate a light bulb to replicate the flicker pattern of reference light source 105. In such a configuration, the sensing device 120 can sense the illumination 115 according to the AC flicker cycle of the AC power source.

For example, the sensing device 120 and the controller 123 can be configured to compute a sequence of N sensor masks according to a previously-acquired image of the illumination 115, the masks define which pixels are masked at any given interval of a total exposure time, the exposure time is of at least two cycles of the AC voltage. In such an exemplary case the controller 123 can be configured to synchronize the switching of the masks of the sensing device 120, according to the AC voltage at an AC outlet, or to a prior state of the AC voltage.

In some cases, the sensing device 120 and the controller 123 can also function as a pixel-wise programmable exposure system for acquiring high dynamic range scene images corresponding to sub-intervals of the AC voltage period. Such a system comprising a sensing device 120 and the controller 123 can be configured to transfer the sensed the illumination of the reference light source to a data, e.g., digital data, representing the flicker cycle to a remote repeating module 130, via connection 115B.

In some cases, the lighting module 130 may utilize an illumination source, such as controllable illumination source 135, for the purpose of illuminating a scene, as aforementioned. Illumination source or illumination sources may optionally be discrete illuminators and may include a light-emitting diode (LED), which may be a white light LED, an infrared light LED, a near infrared light LED, an ultraviolet light LED or any other LED and or combination of the same.

In some embodiments, system 100 also comprises an imaging device 150. The imaging device 150 can also be referred to as an image capturing device/component, e.g., a camera, comprising a lens assembly and sensor or a sensing device. The imaging device 150 can also comprise optical gear used herein to depict a set of components which allow the imaging device 150 to capture light and transform that light into at least one image. In some embodiments of the present invention, lenses are employed to capture light. Image capturing devices, such as sensors, are employed to transform that light into at least one image. In some embodiments of the present invention, an imaging device 150 comprises a plurality of optics such as lens assembly and sensor configured to receive reflected light from target objects and/or scene.

The imaging device 150 can also comprise the optical gear required for capturing the field of view of imaging device 150. FIG. 1 shows an example of field of view 145 of imaging device 150. Imaging device 150 can be positioned such that, at least a portion of the light reflected from a diffuse surface 140 can be captured by the imaging device 150 and the optical gear thereof. I such cases, the diffuse surface 140 can be positioned to accept the controllable illumination source 135 and reflects thereof towards the imaging device 150.

Imaging device 150 can also comprise the required equipment to receive the illumination reflected from the diffuse surface 140 estimate pixel intensity values for pixel sequence in the captured image, and determine a temporal point in the flicker cycle of each estimated pixel intensity value in which each of the images was captured, by comparing the estimated intensity values.

In some cases, the pixel intensity value can be a measurement of the wavelength-weighted power captured by an image sensor. In some cases, the imaging device 150 may be configured to measure the pixel intensity level by measuring the grayscale of the captured image, or the values of one of the color channels R, G, or B or the transformed luminance or an infra-red (IR) channel if such exists, or any other metric indicative of the amount of light captured in a given pixel sequence. In some cases, the imaging device 150 may also be configured to convert the wavelength-weighted power captured by image sensor to numeric values.

According to possible embodiments of the present invention, the imaging device 150 can be configured to utilize a set of pixels, denoted herein as pixel sequence, of an image for estimating the pixel intensity value. Thus, the imaging device can utilize a pixel sequence of an image corresponding to one flicker cycle, wherein the pixel sequence represents a digital image captured by the image sensor, for the purpose of estimating the pixel intensity value. In some cases, the pixel sequence utilized to estimate the pixel intensity value can be a vertical or horizontal sequence of pixels corresponding to one flicker cycle.

According to one aspect of the present invention, the imaging device 150 can comprise a shutter such as a rolling shutter (not shown), at least one hardware processor, and a non-transitory computer-readable storage medium having stored thereon program instructions, the program instructions executable by the at least one hardware processor to: operate the imaging device 150 to capture linear pixel sequences in scene images. The scene can be illuminated by the controllable illumination source 135 generated by the repeating module 130, wherein the controllable illumination source 135 is subject to AC flicker cycle as received by the repeating module 130. In some embodiments, the shutter of the imaging device 150 can be configured to create an inter delay of exposure of the imaging device 150 to the illuminated scene. In some cases, the shutter can be configured to control a gradual exposure of the imaging device 150, to the illuminated scene. In some cases, imaging device 150 can also be configured to capture only one pixel can be captured in each of the images captured in correspondence to one flicker cycle. The captured pixels can be utilized to estimate the pixel intensity values. The pixel intensity values can be utilized to temporal points in the flicker cycle in which the image was captured, by comparing the estimated pixel intensity values.

The imaging device 150 can also be configured to estimate the pixel intensity values and determine a temporal point in the flicker cycle of the pixel sequence in which image was captured, by comparing the estimated pixel intensity values. I some cases, the flicker cycle corresponds to a frequency of the AC current.

In some cases, the system 100 may be configured to operate the imaging device 150 to capture a sequence of images of scene illuminated by the repeating module 130, wherein the pixel intensity value is estimated for each image in the sequence.

By another aspect, the system 100 may be configured to utilize at least one of: reflection correction, color correction, white balancing, de-flickering, relighting, calculating a light response, calculating a chromaticity value, and determine a temporal point in the flicker cycle of the estimated pixel intensity value in which the image was captured, by comparing the estimated pixel intensity values. In some cases, the system 100 can also be configured to utilize pixel intensity variability value of the captured a plurality of pixel arrays. The term "variability" and/or "variability value" are defined as any measurable difference or non-uniformity of a set of values such as fluctuation of values, maximum value minus minimum value, standard deviation, variance, amplitude of a waveform, and the like.

By another aspect, the system 100 can be configured to operate an imaging sensor and a shutter to capture images of a scene illuminated by the controllable illumination source 135 generated by the repeating module 130, wherein the controllable illumination source 135 is subject to AC flicker cycle as received by the repeating module 130, and wherein the shutter is also associated with AC flicker cycle as received by the repeating module 130.

In some embodiments, the illumination source 135 can be projector. In such embodiments, the repeating module 130 can be configured to utilize the illumination source 135 to illuminate the scene wherein the data representing light intensity which corresponds to a flicker cycle is encoded in the scene illumination.

In some embodiments, the imaging device 150 can be configured to capture images of the illuminated scene and decode the encoded data representing light intensity which corresponds to a flicker cycle.

In some cases, the rolling-shutter camera may be employed to quantitatively sense and analyze light flicker. A rolling shutter can be configured to create an inter-row delay of exposure. This delay is constant and very short, enabling fast and dense temporal sampling of flicker. This effect creates a spatiotemporal wave pattern in raw rolling-shutter image. Moreover, regularity and periodicity of this pattern lead to a set of scene analysis approaches, suiting different data sizes and scene types, as detailed in Table 1 below. Even a single rolling-shutter image yields useful information. This includes the types and electric phases of light sources connected to the grid; regions in the scene they illuminate; the bulbs' temporal response to AC; and the time at which the rolling-shutter image was acquired, relative to zero-crossing of the grid voltage.

TABLE 1

| Method | Frames | Applies to | Key assumptions |
| --- | --- | --- | --- |
| Image de-flicker | 1 | Diffuse surfaces | Spatially-smooth light transport, reflection at each pixel dominated by one source |
| Single-frame analysis | 1 | Diffuse surfaces | Spatially-smooth light transport, reflection at each pixel dominated by one source* |
| Two-frame analysis | 2 | Diffuse surfaces | Reflection at each pixel dominated by one source* |
| Star-filter analysis | 2 | Directly viewed sources | Image contains spatially separated light sources; an optical star-filter attached to the lens |
| Surface-based | Many | Scenes having a diffuse surface | A wide, diffuse surface is in view |
| Emitter-based | Many | Any scene | Entire batch of frames |
| Render global shutter | Many | Any scene | After frame assignment by Example 15, one known scene bulb (for AC analysis application only) |
| Real-time | Stream | Scenes having a diffuse surface | Continuous assignment using Example 15, one known scene bulb (for AC analysis application only) |

*A BRF database may be utilized, in some embodiments.

In some embodiments of the present invention, the imaging device 150 is a camera. In some embodiments, the camera can be integrated with a computer, smart phone, a webcam, and the like. In some cases, the camera is a commercially available camera. In some cases, the camera is a black and white camera. In some cases, the camera is a color camera. In some cases, the camera is a black and white or color camera. In some cases, the camera delays the exposure of each row. In some cases, the camera delays the exposure of each column. In some cases, the camera delays the exposure of each row and/or column.

In some embodiments of the present invention, the estimating of the pixel intensity value can be based, at least in part, on applying to the image at least one digital bandstop filter (not shown). In some cases, the bandstop filter has a frequency response which is a multiple of (i) and inter-row or inter-column delay value of the rolling shutter, divided by (ii) a duration of an AC flicker cycle. In some cases, the bandstop filter has a frequency response which blocks multiple harmonics of a base frequency given as a multiple of (i) and inter-row or inter-column delay value of the rolling shutter, divided by (ii) a duration of an AC flicker cycle. It should be understood by one having ordinary skills in the art that for cameras with a row delay the value can be the delay between rows, and for cameras with a column delay the value can be delay between columns. In some cases, the multiple is an integer multiple. In some cases, the harmonic can be a multiple or integer multiple. In some embodiments, the bandstop filter blocks the main frequency. In some cases, the bandstop filter blocks the main frequency and at least one of its harmonics.

In some cases, the identification further comprises determining a waveform of the illumination reflected from the diffuse surface 140. In some embodiments, the identification further comprises determining at least one of a light response function, a chromaticity value, and an electric phase of the light illumination. In some cases, the identification further comprises determining at least one of a light response function, a chromaticity value, a contribution of each light source to the total illumination in the image, and a waveform of the light illumination. In some cases, the identification further comprises determining a point in a cycle of the received AC flicker cycle in which the image was captured. In some cases, the determining the point in a cycle is determining the phase of the AC flicker cycle. In some cases, the phase is selected from 0, 120 and 240 degrees.

In some cases, the instructions by the system 100 further comprise operating the imaging device 150 to capture a second image. In some embodiments, the exposure time used for capturing the second image is equal to an integer multiple of the AC flicker cycle. In some cases, the exposure time is equal to an integer multiple of the AC flicker cycle. In some embodiments, the estimating is based, at least in part, on the second image.

In some cases, the instructions further comprise operating the imaging device 150 to capture a plurality of images. In some embodiments, the estimating is base, at least in part, on identifying a second pixel or pixels relating to the diffuse surface 140 in the images. It can be apricated by one having ordinary skills in the art, that for cameras with vertical delay the sequence will be vertical and for cameras with horizontal delay the sequence can be horizontal. In some cases, the estimating is based, at least in part, on estimating a temporal difference between each pair of images. In some cases, the estimating difference is based at least in part on relative pixel intensity values of a selected pixel in the pair of images. In some cases, the estimating difference can be based at least in part on relative pixel intensity values of corresponding pixels in the pair of images. In some embodiments, the identifying comprises at least determining a point in an AC flicker cycle in which each of the images was captured. In some embodiments, the phase of the AC flicker cycle can be determined. In some embodiments, the point in the cycle in which all of the images were captured is determined.

In some embodiments, the identifying further comprises generating a global-shutter image. In some embodiments, the global-shutter image is generated at any point during the period. In some embodiments, the global-shutter image is generated at any point during the AC flicker cycle. In some embodiments, the global-shutter image can be based, at least in part, on estimating Fourier series coefficients of a temporal signal observed at each pixel in the image.

In some embodiments, the period is longer than an AC flicker cycle. In some embodiments, the period is multiple AC flicker cycle. In some embodiments, the period is as long as the shutter is open.

In some embodiments, the scene is illuminated by at least one light source of the repeating module 130. In some embodiments, the scene is illuminated by at least 2 light sources of the repeating module 130. In some embodiments, the scene is illuminated by a plurality of light sources of the repeating module 130. In some embodiments, the light sources are attached to an AC flicker cycle. In some embodiments, the light sources are all attached to the repeating module 130. In some embodiments, the light sources are attached to the repeating module 130 as the system of the invention. In some embodiments, at least one light source is not a man-made light source. In some embodiments, at least one light source may not run on AC power. In some embodiments, at least one light source is not connected to an AC power grid. In some embodiments, the light source is selected from a fluorescent bulb, a non-fluorescent bulb, an LED, an incandescent bulb, a halogen bulb, a compact fluorescent bulb, a sodium lamp, a mercury lamp and a metal halide lamp.

In some embodiments, the light source is within direct view of the imagining device 150. In some embodiments, the light source is out of the view of the imaging device 150. In some embodiments, the light source is within direct view of the imaging device 150 and the image is captured using an optical filter (not shown) operatively coupled to the imaging device. In some embodiments, the optical filter has a transfer function that creates stripes in the captured image. In some embodiments, the stripes are an optical spread. In some embodiments, the stripes are horizontal, vertical or both. In some embodiments, the optical filter has an optical transfer function, or a point spread function, that creates stripes on a sensor plane with the filter. In some embodiments, the optical filter has an optical transfer function, or a point spread function, that creates stripes on an image taken with the filter. In some embodiments, the optical filter is a star filter. Examples of optical filters include, but are not limited to a diffuser, a prism a diffraction grating, a star filter and a fast-rotating mirror. In some embodiments, the optical filter is anything that spreads light. In some embodiments, the optical filter creates a two-arm, or more, spread. In some embodiments, the image is captured using an optical filter operatively coupled to the imaging device. In some embodiments, the imaging device further comprises an optical filter.

Machine learning is well known in the art, and the systems of the invention can be configured to use a machine learning algorithm to identify and categorize different AC-powered reference light sources. In some embodiments, at least 1, 2, 3, 4, 5, 6, 7, 8, 9, 10, 15, or 20 light sources with different bulb response functions (BRFs) are analyzed before the algorithm can identify and/or classify an unknown AC flicker cycle.

Figure 2:
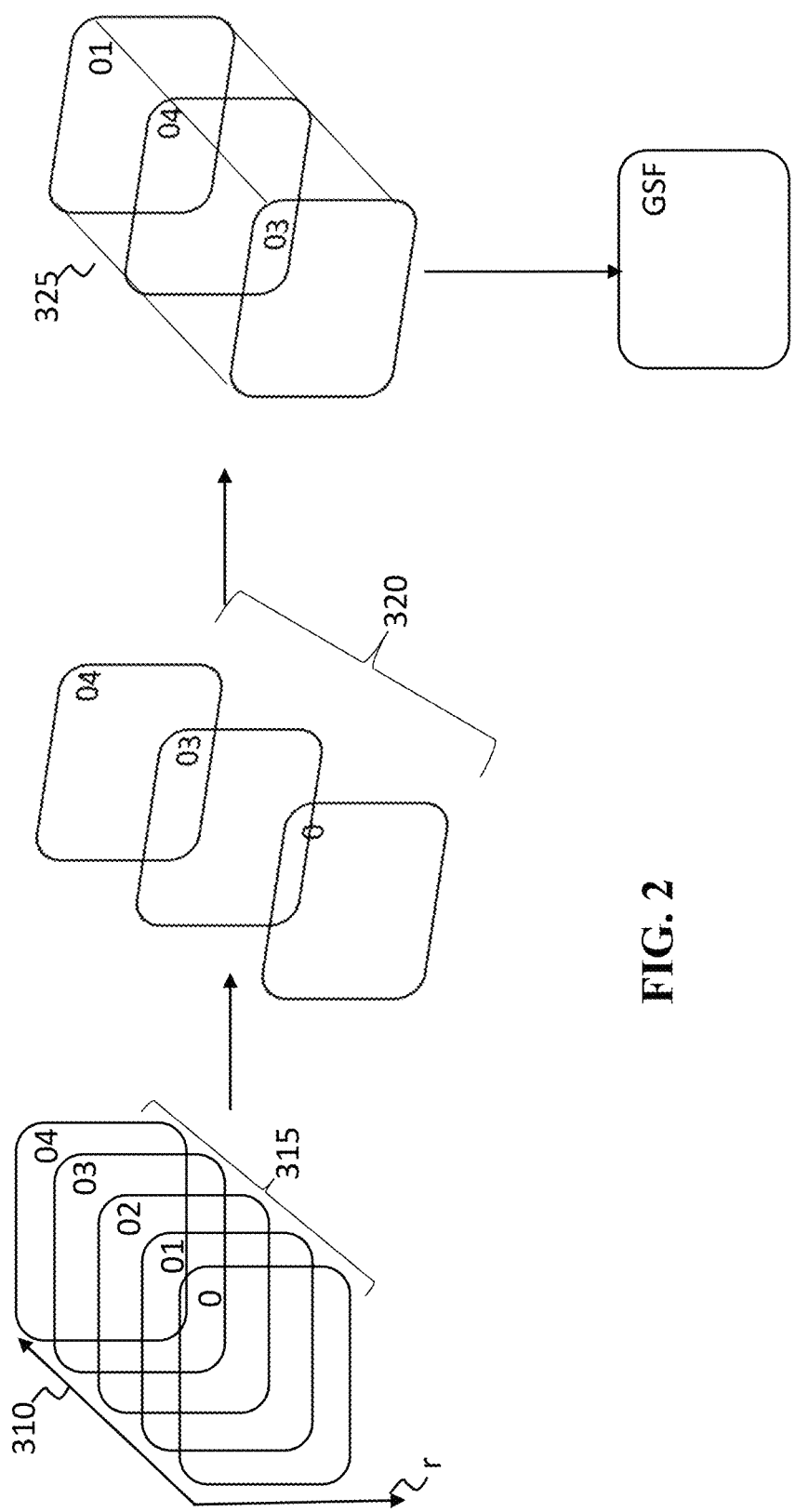
FIG. 2 discloses a schematic description of rolling-shutter imaging under AC lighting, according to exemplary embodiments of the present invention.

FIG. 2 discloses a schematic description of rolling-shutter imaging under AC lighting, according to exemplary embodiments of the present invention. FIG. 2 shows an image sequence 315 comprising images 0, 01, 02, 03, and 04. In the image sequence 315, the topmost row is sampled at absolute time $t_k^{abs}$, wherein k denotes the number of the image according to the time sequence presented by arrow 310. In that case, image 0 shown in FIG. 2 is denoted by $t_0^{abs}$ image 01 is denoted by $t_1^{abs}$ image 02 is denoted by $t_2^{abs}$ image 03 is denoted by $t_3^{abs}$, and image 04 is denoted by $t_4^{abs}$.

In the schematic description shown in FIG. 2, the arrow r can show the direction of the rolling-shutter during the image capturing time. Such image capturing can be configured to be with constant delay D relative to row r−1. In such a case, the image sequence 320 shows the corresponded images, wherein $t_0^{abs}$ is denoted as $t_0^{can}$ in image sequence 320, $t_3^{abs}$ is denoted as $t_3^{can}$ in image sequence 320, and $t_4^{abs}$ is denoted as $t_4^{can}$ in image sequence 320. Thus, the space-time volume $i(r, c, t^{abs})$ is sampled along diagonal slices. The resulting rolling-shutter image exhibit a wave pattern in each image and across images. Each $t_k^{abs}$ corresponds to an in-cycle canonical time $t_k^{can} \in [0, \Delta]$, where $\Delta$ is the flicker cycle. Once the canonical times is assigned to all images, a global-shutter image of the scene at any arbitrary canonical time $t^{can}$ can be computed as shown in image sequence 325. This approach is utilized to render the scene at any arbitrary in-cycle canonical time, that had not been sampled during rolling-shutter image acquisition. This capability exploits the periodicity and regularity of flicker, which naturally suits Fourier analysis. As a result, emulated global shutter image is generated as schematically shown in image GSF.

Rolling-Shutter Imaging Under AC Flicker

AC voltage is approximately a sinusoid in time. In such cases, a frequency denoted by f is either 50 Hz or 60 Hz, depending on the country. Reference light source 105 then flickers at double the AC frequency, in a cycle lasting $\Delta=1/(2f)$ seconds. Each light source is powered by one of three electric grid phases, having respective AC phases $\phi \in \{0°, 120°, 240°\}$. Any electric outlet or light source connected to one of these power lines can be considered as a reference, i.e., having $\phi=0°$.

Events of interest, such as raw image acquisition, take place in absolute time, denoted $t^{abs} \in \mathbb{R}$. On the other hand, because flicker is periodic, it suffices to define flicker by an in-cycle canonical time $t^{can} \in [0, \Delta]$. In this case, the origin $t_{can}=0$ can be set to be a zero crossing of the AC voltage at a reference bulb, or a reference light source. A bulb type is denoted by $\beta$. The bulb flicker is its response to AC. The response is expressed as a unit-less bulb response function (BRF), denoted $B_\beta(t^{can})$. For every color channel the BRF satisfies $$\frac{1}{\Delta}\int_0^\Delta B_\beta(t^{can}) dt^{can} = 1.$$

Herein, the time variable $t^{can}$ ranges over the circular domain $[0, \Delta]$. If a light source can be connected to an outlet of phase $\phi$, then the light source's flicker response is $B_\beta(t^{can}-\phi\Delta/2\pi)$.

An image has R×C pixels, where r indexes rows and c indexes columns. The scene is illuminated by S sources, indexed by s. Let $B_s$ be the BRF of the bulb type to which source s belongs, and $\phi_s$ be the electric phase to which this source is connected. The intensity of an object illuminated by S sources at pixel (r,c) is $$i(r,c,t^{can})=\sum_{s=1}^S \tau_s(r,c) B_s(t^{can}-\phi_s\Delta/2\pi).$$

Here $\tau_s(r,c)$ is the response of image pixel (r,c) to illumination by s. It encompasses image radiance factors that depend on the distance of the object from the light source, surface slope, albedo, lens aperture, bidirectional reflectance, inter-reflections and exposure duration $T_{exp}$. That is, $\tau_s(r,c)$ is the light transport coefficient at this pixel. The transport coefficients in all pixels constitute a matrix $\tau_s$.

In a rolling shutter, the exposure of each row is delayed by D seconds relative to the preceding row. Though some rolling-shutter sensors delay columns rather than rows, without loss of generality, assuming a sensor with inter-row delay. Let row 0 (topmost row) be acquired at absolute time $t_k^{abs}$, where k=0, 1, . . . is the discrete index of a captured rolling-shutter image. Row r is thus acquired at time $$t_{k,r}^{abs}=t_k^{abs}+rD.$$

Rows thus correspond to distinct temporal samples. Often D is much smaller than the exposure duration $T_{exp}$. This enables a high temporal sampling rate (1/D Hz), while enough photons accumulate during $T_{exp}$ for a high signal.

An image formation of an AC-illuminated scene that is viewed by a rolling-shutter camera may be thus modelled. The topmost row of a rolling-shutter image k is acquired at $t_k^{abs}$. This $t_k^{abs}$ corresponds to some in-cycle canonical time $t_k^{can}$. This means that there is a mapping $$k \mapsto t_k^{can} \in [0,\Delta].$$

In the method described herein, this mapping can be derived from image data. In such a case, the assumption is that this mapping is known. Row r of rolling-shutter image k is acquired at canonical time $$t_{k,r}^{can}=t_k^{can}+rD.$$

Let $i_k^{roll}(r,c)$ be the intensity measured at pixel (r,c) of image k. Combining Eqs. (25,28), this intensity is equal to:

$$i_k^{roll}(r,c) = \sum_{s=1}^S \tau_s(r,c) B_s(t_k^{can}+rD-\phi_s\Delta/2\pi).$$

This corresponds to a spatial vertical wave pattern with a period of $\Delta/D$ rows. To see this mathematically, consider a region $\Omega$ for which $\tau_s(r,c)$ is vertically uniform, i.e., independent of r. Then, it satisfies $$i_k^{roll}(r,c)=i_k^{roll}(r+\Delta/D,c).$$

For a sequence of rolling-shutter images, it expresses a spatiotemporal wave function that moves vertically with upward velocity $$v=1/D$$

pixels per second. To see this, consider two consecutive rolling-shutter images, k and k+1, whose canonical times are $t_k^{can}$, $t_{k+1}^{can}$, respectively. In an image region $\Omega$ for which $\tau_s(r,c)$ is vertically uniform, it satisfies $$i_k^{roll}(r,c)=i_{k+1}^{roll}(r-v(t_{k+1}^{can}-t_k^{can}),c).$$

This wave motion is independent of the scene's BRFs.

When the exposure time is $\Delta$ (e.g., 0.01 sec in a 50 Hz electric grid) or an integer multiple thereof, the image is unaffected by the wave pattern and emulates imaging under DC. Thus:

$$i^{DC}(r,c) = \frac{1}{\Delta}\int_0^\Delta \sum_{s=1}^S \tau_s(r,c) B_s(t_k^{can}+rD-\phi_s\Delta/2\pi) dt^{can} = \sum_{s=1}^S \tau_s(r,c).$$

In some embodiments, imaging device 150 is operated to capture an image of a scene illuminated by at least one AC powered light source, wherein the image is subject to spatial flickering, generate a de-flickered image by extracting, for each pixel in the image, a flicker-independent intensity value.

In some embodiments, imaging device 150 is operated to capture an image sequence of a scene illuminated at least by one light source powered by an AC power source, estimate a set of pixel intensity values for a vertical or horizontal sequences of pixels corresponding to one flicker cycle, compare the estimated pixel intensity values corresponding to images of the image sequences, and identify a waveform of the AC current which powers the reference light source.

In some embodiments, imaging device 150 is operated to capture an image of a scene illuminated at least by one light source powered by an AC power source, apply a machine learning classifier to a set of pixel intensity values for a vertical or horizontal sequence of pixels corresponding to one flicker cycle, wherein the classifier was trained on a plurality of sets of pixel intensity values corresponding to a plurality of labeled light source, wherein the application of the classifier results in identification of the waveform of the AC current which powers the reference light source.

In some embodiments, there is provided a method for de-flickering an image subject to spatial flickering, comprising: capturing with a rolling shutter imaging device an image of a scene illuminated by a single light source powered by an AC power source, wherein the image is subject to spatial flickering, extracting for each pixel in the image a flicker-independent intensity value, thereby extracting a de-flickered image from an image with spatial flickering.

In some embodiments, there is provided a method comprising: operating a rolling shutter imaging sensor to capture one or more images of a scene that is illuminated, at least in part, by an AC-powered reference light source; estimating pixel intensity values for a vertical or horizontal sequence of pixels in the one or more images, the sequence corresponding to a flicker cycle of the AC-powered reference light source; and determining an identity of the AC-powered reference light source, based on the estimation. In some embodiments, the pixel intensities are flicker-independent.

In some embodiments, there is provided a method comprising: operating an imaging sensor and a shutter to capture image of a scene illuminator by a plurality of AC-powered reference light sources, wherein the shutter is associated with AC mains power and is controlled to open and close based on cycles of the AC mains power; and extracting, for the image, different components related to different ones of the light sources.

In some embodiments, the identification further comprises determining an electric phase of the light source. In some embodiments, the identification further comprises determining at least one of a light response function, a chromaticity value, and an electric phase of the light source. In some embodiments, the identification further comprises determining at least one of a light response function, a chromaticity value, a contribution of each light source to the total illumination in the image, and an electric phase of the light source. In some embodiments, the identification further comprises determining a point in a cycle of the AC power source in which the image was captured. In some embodiments, the determining the point in a cycle is determining the phase of the cycle. In some embodiments, the phase is selected from 0, 120 and 240 degrees.

In some embodiments, the instructions of system 100 further comprise operating the imaging device to capture a plurality of images. In some embodiments, the estimating is base, at least in part, on identifying a second vertical or horizontal sequence of pixels relating to a diffuse surface in the images. Cameras with vertical delay the sequence can be vertical and cameras with horizontal delay the sequence can be horizontal. In some embodiments, the estimating is based, at least in part, on estimating a temporal difference between each pair of images. In some embodiments, the estimating difference is based at least in part on relative pixel intensity values of a selected pixel in the pair of images. In some embodiments, the estimating difference is based at least in part on relative pixel intensity values of corresponding pixels in the pair of images. In some embodiments, the identifying comprises at least determining a point in a cycle of the AC power source in which each of the images was captured. In some embodiments, the phase of the cycle is determined. In some embodiments, the points in the cycle in which the images were captured are determined.

In some embodiments, the identifying further comprises generating a global-shutter image. In some embodiments, the global-shutter image is generated at any point during the period. In some embodiments, the global-shutter image is generated at any point during the cycle. In some embodiments, the global-shutter image is based, at least in part, on estimating Fourier series coefficients of a temporal signal observed at each pixel in the image. In some embodiments, the Fourier series coefficients are determined using at least one of equations 47, 48, and 49. In some embodiments, the Fourier series coefficients are determined using equation 56. In some embodiments, the Fourier series coefficients are determined using at least one of equations 47, 48, 49 and 56.

In some embodiments, the period of the capturing the image sequence is longer than an AC cycle. In some embodiments, the period is multiple AC cycles. In some embodiments, the period is as long as the shutter is open.

In some embodiments, the scene is illuminated by at least one light source. In some embodiments, the scene is illuminated by at least 2 light sources. In some embodiments, the scene is illuminated by a plurality of light sources. In some embodiments, the light sources are attached to an AC power grid. In some embodiments, the light sources are all attached to the same AC power grid. In some embodiments, the light sources are attached to the same AC power grid as the system of the invention. In some embodiments, at least one light source is a natural light source. In some embodiments, at least one light source is not a man-made light source. In some embodiments, at least one light source does not run on AC power. In some embodiments, at least one light source is not connected to an AC power grid. In some embodiments, the light source is in a database. In some embodiments, the light source is selected from a fluorescent bulb, a non-fluorescent bulb, an LED, an incandescent bulb, a halogen bulb, a compact fluorescent bulb, a sodium lamp, a mercury lamp and a metal halide lamp.

In some embodiments, the light source is within direct view of the imagining device 150. In some embodiments, the light source is out of the view of the imaging device 150. In some embodiments, the light source is within direct view of the imaging device 150 and the image is captured using an optical filter operatively coupled to the imaging device 150. In some embodiments, the optical filter has a transfer function that creates stripes in the captured image. In some embodiments, the stripes are an optical spread. In some embodiments, the stripes are horizontal, vertical or both. In some embodiments, the optical filter has an optical transfer function, or a point spread function, that creates stripes on a sensor plane with the filter. In some embodiments, the optical filter has an optical transfer function, or a point spread function, that creates stripes on an image taken with the filter. In some embodiments, the optical filter is a star filter. Examples of optical filters include, but are not limited to a diffuser, a prism a diffraction grating, a star filter and a fast-rotating mirror. In some embodiments, the optical filter is anything that spreads light. In some embodiments, the optical filter creates a two-arm, or more, spread. In some embodiments, the image is captured using an optical filter operatively coupled to the imaging device. In some embodiments, the imaging device further comprises an optical filter.

Machine learning is well known in the art, and the systems of the invention can use a machine learning algorithm to identify and categorize different AC-powered reference light sources. In some embodiments, at least 1, 2, 3, 4, 5, 6, 7, 8, 9, 10, 15, or 20 light sources with different BRFs are analyzed before the algorithm can identify and/or classify an unknown AC-powered reference light source.

In some embodiments, the methods of the invention further comprise color-correcting at least one of the one or more images. In some embodiments, the color correction is based on the determined identity of the AC-powered reference light source. In some embodiments, the methods of the invention further comprise determining a phase of the AC power. In some embodiments, the determining is determining a phase of the AC power of at least one light source illuminating the scene. In some embodiments, the phase of the AC power is determined based on the estimation. In some embodiments, when the scene is illuminated by multiple light sources the methods of the invention further comprise creating at least one new image of the scene, each image simulating an appearance of the scene under illumination by at least one of the multiple AC-powered reference light sources. In some embodiments, the simulated appearance is of the scene under illumination by not all of the light sources. In some embodiments, the simulated appearance is of the scene under illumination by only one light source. In some embodiments, the simulated appearance is of the scene under illumination by a different light source that did not originally illuminate the scene. In some embodiments, the methods of the invention further comprise relighting the scene. In some embodiments, the methods of the invention further comprise decomposing the lighting of the scene. In some embodiments, the methods of the invention further comprise at least one of: color-correcting at least one of the one or more images; determining a phase of the AC power, and when the scene is illuminated by more than one light source creating at least one new image of the scene simulating the scene illuminated by not all of the more than one light source.

In some embodiments, the methods of the invention further comprise color-correcting at least one of the one or more images. In some embodiments, the color correction is based on the determined identity of the AC flicker cycle. In some embodiments, the methods of the invention further comprise determining a phase of the AC power.

In some embodiments, the determining is determining a phase of the AC power of at least one light reference source. In some embodiments, the phase of the AC power is determined based on the estimation. In some embodiments, when the scene is illuminated by multiple AC-powered reference light sources the methods of the invention further comprise creating at least one new image of the scene, each image simulating an appearance of the scene under illumination by at least one of the multiple AC-powered reference light sources. In some embodiments, the simulated appearance is of the scene under illumination by only one reference light source. In some embodiments, the simulated appearance is of the scene under illumination by a different light source that did not originally illuminate the scene. In some embodiments, the methods of the invention further comprise relighting the scene. In some embodiments, the methods of the invention further comprise decomposing the lighting of the scene. In some embodiments, the methods of the invention further comprise at least one of: color-correcting at least one of the one or more images; determining a phase of the AC power, and when the scene is illuminated by more than one light source creating at least one new image of the scene simulating the scene illuminated by not all of the more than one light source.

In some instances, a data sequence of multiple raw rolling-shutter images. The sequence is converted to a canonical volume that expresses the spatiotemporal signal of flicker, as if acquired by a very fast global-shutter camera. This conversion can handle temporally disorganized sequences, such as those acquired manually as stills by a smartphone. This approach is utilized to render the scene at any arbitrary in-cycle canonical time, that had not been sampled during rolling-shutter data acquisition. This capability exploits the periodicity and regularity of flicker, which naturally suits Fourier analysis.

Single-Image De-Flickering by Filtering

The flicker that affects $i_k^{roll}$ has a known spatial frequency of $D/\Delta$. This frequency is utilied to decompose $i_k^{roll}$ into a flicker-dependent and flicker-independent component. This operation is motivated by common (non-flicker) intrinsic-image decomposition techniques.

Consider an image region illuminated by a single source s. Then, it becomes $$i_k^{roll}(r,c) = \tau_s(r,c) B_s(t_k^{can} + rD - \phi_s \Delta/2\pi)$$

for all pixels in the region. This is a product of a flicker-independent component $\tau_s(r,c)$ and a flicker dependent component $B_s(t_k^{can},r) \equiv B_s(t_k^{can} + rD - \phi_s \Delta/2\pi)$. From above:

$$\ln[i_k^{roll}(r,c)] = \ln[\tau_s(r,c)] + \ln[B_s(t_k^{can},r)].$$

Due to the vertical periodicity of $B_s(t_k^{can},r)$, all the signal energy associated with $\ln[B_s(t_k^{can},r)]$ resides in specific spatial frequencies: $0, \pm D/\Delta, \pm 2D/\Delta, \ldots$. Thus, M non-DC harmonics of $\ln[B_s(t_k^{can},r)]$ can be eliminated using a linear filter $V(r)$ whose frequency response blocks frequencies $\pm D/\Delta, \pm 2D/\Delta, \ldots \pm MD/\Delta$. This vertical homomorphic spatially invariant filtering yields $$\hat{\tau}(r,c) \equiv \exp(\ln[i_k^{roll}]*V(r)) = \exp(\ln[\tau_s(r,c)]*V(r) + \ln[B_s(t_k^{can},r)]*V(r)) = \exp$$
$$\overline{B}_s \cdot \exp(\ln[\tau_s(r,c)]*V(r)) \sim \tau_s(r,c).$$

Figure 3:
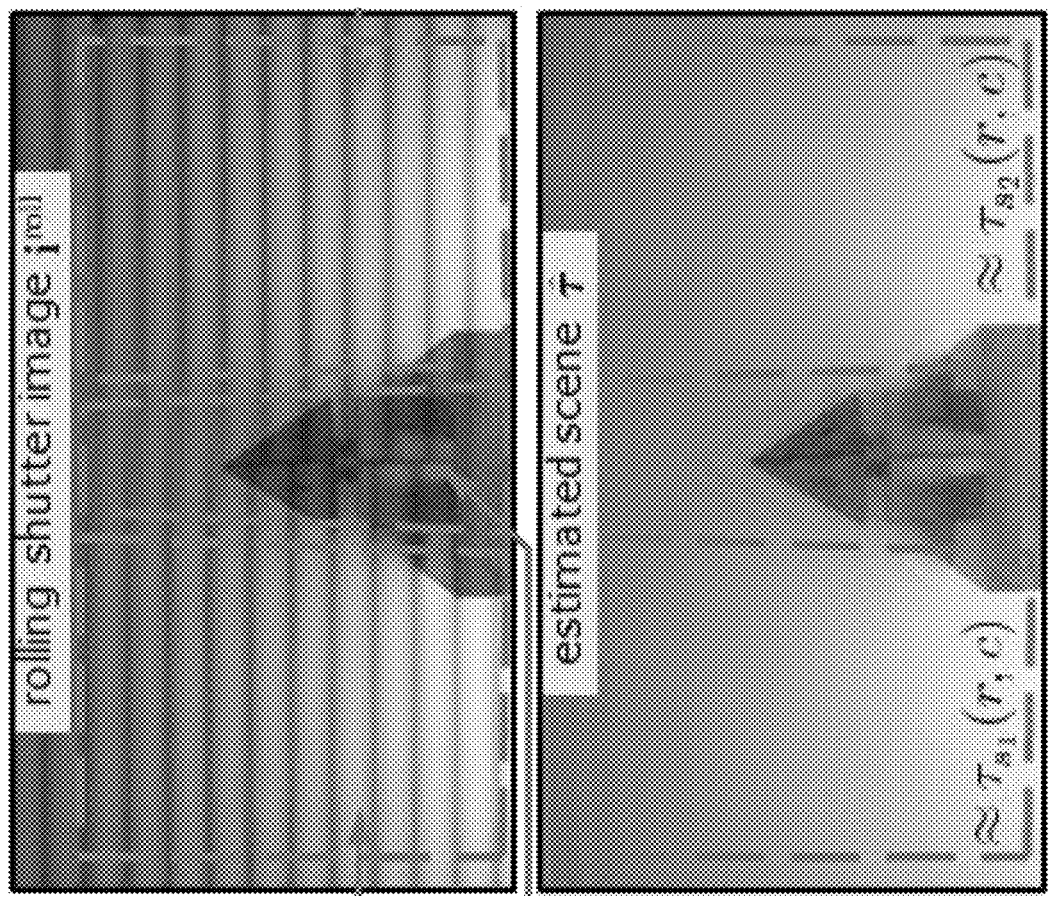
FIG. 3 is a rolling-shutter image of a scene illuminated from its sides by two identical light source powered by different AC phases. In the top image flicker induces waveform patterns. An image with single-frame de-flickering using a digital bandstop filter tuned to the flicker frequency and its higher harmonics is also provided. Line graph of the spectrum of a single image column before and after deflicker filtering. In the x-axis, the image spatial frequency (in pixel units) is multiplied by 1/D to yield the corresponding temporal frequency.

Here $\overline{B}_s$ is the temporal mean of $\ln[B_s]$. For any image region dominated by any single source s, the result $\hat{\tau}(r,c)$ approximates $\tau_s(r,c)$ there (FIG. 3, bottom).

In some cases, the cascade of digital filters is utilized, i.e., $V(r) = V_1(r)*V_2(r)*\ldots*V_M(r)$. Each $V_m(r)$ blocks the $m^{th}$ flicker harmonic by a 4 order bandstop Bessel filter, defined by a critical bandstop domain $[D(m/\Delta - \varepsilon), D(m/\Delta + \varepsilon)]$. In our case $1/\Delta = 100$ Hz, $\varepsilon = 8$ Hz and $M = 8$.

AC Lighting Retrieval from a Single Image

Image regions mainly illuminated by a single source are modeled by. Different sources may illuminate different image regions. In regions dominated by each source s, the options can be (a) the bulb type $\beta \in \mathbb{B}$ per s, (b) the electric phase $\phi_s$, and (c) the canonical time of the image $t_k^{can}$. The AC phase $\phi_s$ and $t_k^{can}$ are linearly coupled. Hence define an unknown $$g_k^{can} = t_k^{can} - \phi\Delta/2\pi.$$

Assuming an approximation of the transport coefficients $\overline{\tau}_s$. Such an approximation can be obtained by the filtering operation as above. Alternatively, if the flicker spatial period is small, $\overline{\tau}_s$ may be approximated by a low-pass filter of $i_k^{roll}$. Then $$i_k^{filt}(r,c) \equiv \frac{i_k^{roll}(r,c)}{\hat{\tau}_s(r,c)} \cong B_s(t_k^{can} + rD - \phi\Delta/2\pi).$$

Define a vertical image line $\overline{\Omega}_{r,c} \in \Omega$ with length of a single flicker cycle in pixels centered at pixel (r,c):

$$\overline{\Omega}_{r,c} = \{(r-l,c), \ldots, (r,c), \ldots, (r+l,c)\},$$

where $l = \lfloor \Delta/(2D) \rfloor$. The mean intensity of $i_k^{filt}$ on $\overline{\Omega}_{r,c}$ is $\mu_{r,c}$. Let $$F_{r,c}(g_k^{can}, \beta) = \sum_{(r',c') \in \overline{\Omega}_{r,c}} \left| \frac{i_k^{filt}(r',c')}{\mu_{r,c}} - B_\beta(g_k^{can} + r'D) \right|.$$

This normalizes $i_k^{filt}$ by $\mu_{r,c}$ so that the subsequent analysis is insensitive to any potential residual scale factor. Recognizing the bulb type $\beta$ that dominates pixel (r,c) as well as the value of $g_k^{can}$ there using $$\{\hat{g}_k^{can}(r,c), \hat{\beta}(r,c)\} = \arg\min_{g_k^{can} \in [0,\Delta], \beta \in \mathbb{B}} F_{r,c}(g_k^{can}, \beta).$$

Once $\hat{g}_k^{can}(r,c)$ has been estimated for all pixels, and a decompose thereof into an associated per-pixel electric-grid phase $\phi(r,c)$ and image canonical time $t_k^{can}$ can take place. Let pixel $(r_0,c_0)$ be strongly dominated by illumination from the reference AC outlet. Hence, set $\hat{\phi}(r_0,c_0)=0°$. Thus:

$$\hat{t}_k^{can} = \hat{g}_k^{can}(r_0,c_0)$$

Based on the above:

$$\hat{\phi}(r,c) = 2\pi[\hat{t}_k^{can} - \hat{g}_k^{can}(r,c)]/\Delta.$$

It is expected that in areas that are strongly dominated by a single source, $\hat{\phi}(r,c)$ should be either 0°, 120°, or 240°.

Two Images: Transport-Invariant Analysis and Optical Star-Filter for Emitter Analysis Previously it is assumed an approximately constant $\tau_s$ per region $\Omega$. A compensation for deviation from this assumption can be provided by roughly estimating $\tau_s$ from a single image. However, the $\tau_s$ can be retrieved directly by utilizing a second image. Specifically, in addition to $i_k^{roll}$, let us capture $i_k^{DC}$. In image regions dominated by s, $$i^{DC}(r,c) = \tau_s(r,c) + \sum_{s' \neq s} \tau_{s'}(r,c) \cong \tau_s(r,c).$$

Then derive $$i_k^{norm}(r,c) = \frac{i_k^{roll}(r,c)}{i^{DC}(r,c)} = B_s(t_k^{can} + rD - \phi_s\Delta/2\pi).$$

Thus, in a region dominated by a single source, the image $i_k^{norm}$ is invariant to the scene's light transport $\tau_s$, expressing $B_s(t_k^{can} + rD - \phi_s\Delta/2\pi)$, as desired.

Canonical Volume from an Image Sequence

In these cases, a long sequence of $K^{roll}$ raw rolling-shutter images is utilized. They express a data volume $I^{roll} = [i_0^{roll}, i_1^{roll}, \ldots i_{K^{roll}-1}^{roll}]$. A canonical volume $I^{can}$ can be used, whose spatial domain is discrete (pixels), and whose time domain is continuous. The canonical volume expresses the spatiotemporal flicker signal. To achieve this, each input index k should be mapped to an in-cycle canonical time $t_k^{can}$ according to Eq. (27). Consequently, the output intensity $i^{can}(r,c, t_k^{can})$ at each pixel (r,c) can be thought of as the output of a very fast light detector that captures $K^{roll}$ consecutive samples in $[0,\Delta]$. Once the assignment in Eq. (27) is computed, and re-sample and discretize the canonical time domain $t^{can}$ to emulate a global-shutter sequence using any method of choice, can be chosen.

This faces three challenges:
a. The raw temporal order of the rolling-shutter images is often meaningless. Consider the images captured in absolute times $t_1^{abs} < t_2^{abs} < t_3^{abs} \ldots$. This ordering is generally not maintained in the corresponding canonical times $t^{can}$, i.e, $t_2^{can} < t_{32}^{can} < t_3^{can} < t_1^{can} \ldots$. This is largely because our rolling-shutter camera's clock is unsynchronized and untethered to the AC. This problem is exacerbated when taking a sequence of still images at random times, e.g., by a cellphone.

b. Even when the images are well sorted, the time interval between them is not a fixed fraction of the flicker cycle, i.e., $|t_{k+1}^{abs} - t_k^{abs}| \neq |t_{k+1}^{can} - t_k^{can}|$. This is mainly due to jitter of the AC grid and is exacerbated by jitter of the camera electronics.

c. Temporal shift. Suppose the entire canonical time axis is cyclically shifted globally by $\delta$. This shift does not affect the temporal order of images or the interval between them and is inconsequential to many applications. However, such a shift does affect the relation between canonical time and the AC zero crossing and must be eliminated to accurately relate image measurements to the grid's behavior. A solution of these challenges can be elaborated hereinbelow.

The canonical time can be computed for each image up to an unknown shift both for scenes having a significant large diffuse surface, and for emitter scenes. Because it is not solved for a global shift currently, all canonical times are determined relative to the first image, whose canonical time is denoted $t_0^{can}$.

Canonical Times from Diffuse Surfaces: Suppose there is a large diffuse surface in the scene, such as a wall, reflecting light towards the camera. Recall that in this case, the rolling-shutter sequence creates a spatiotemporal wave whose vertical motion and velocity are independent of BRFs. Consequently, the wave's motion enables estimation of canonical time differences, e.g., $t_k^{can} - t_0^{can}$, without prior knowledge of bulb BRFs.

Similar to before, a vertical image region $\Omega$, where the corresponding diffuse surface is mainly illuminated by a single source s. $\Omega$ can be chosen in an image region that clearly exhibits a flicker wave pattern. The imaging model is thus represented by Eq. (34). As described hereinabove, shift analysis is simplified if it relies on images $i_k^{norm}$ having vertical flicker that is invariant to spatial variations of $\tau_s$ in the scene.

Irrespective of the BRFs in the scene, the wave pattern in $i_k^{norm}$ has a spatial period of $\Delta/D$ pixels, i.e, fundamental angular spatial frequency $2\pi D/\Delta$. In some cases, the frequency can rely on simple Fourier analysis. The fundamental mode of the pattern has phase $$\theta_k = \text{angle}\left\{\sum_{(r',c') \in \bar{\Omega}} i_k^{norm}(r',c')\exp(j2\pi r'D/\Delta)\right\},$$

not to be confused with electric grid phase. Here angle is the argument of a complex number and $\bar{\Omega}$ is an image line in $\Omega$. Comparing to the pattern phase $\theta_0$ of k=0, the canonical time assignment of image k satisfies $$t_k^{can} - t_0^{can} = \frac{\theta_k - \theta_0}{2\pi}\Delta.$$

Recall that for $i_k^{norm}$ an $i^{DC}$ is required. However, there is no need to capture $i^{DC}$ if an assignment for an entire batch of images is computed, whose sampling times $t_k^{can}$ span the interval $[0,\Delta]$ uniformly. The approximation can be by using $$i^{DC}(r,c) \approx \frac{1}{K^{roll}} \sum_k i_k^{roll}(r,c) \approx \tau_s(r,c).$$

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Various embodiments and aspects of the present invention as delineated hereinabove and as claimed in the claims section below find experimental support in the following examples.

Figure 4:
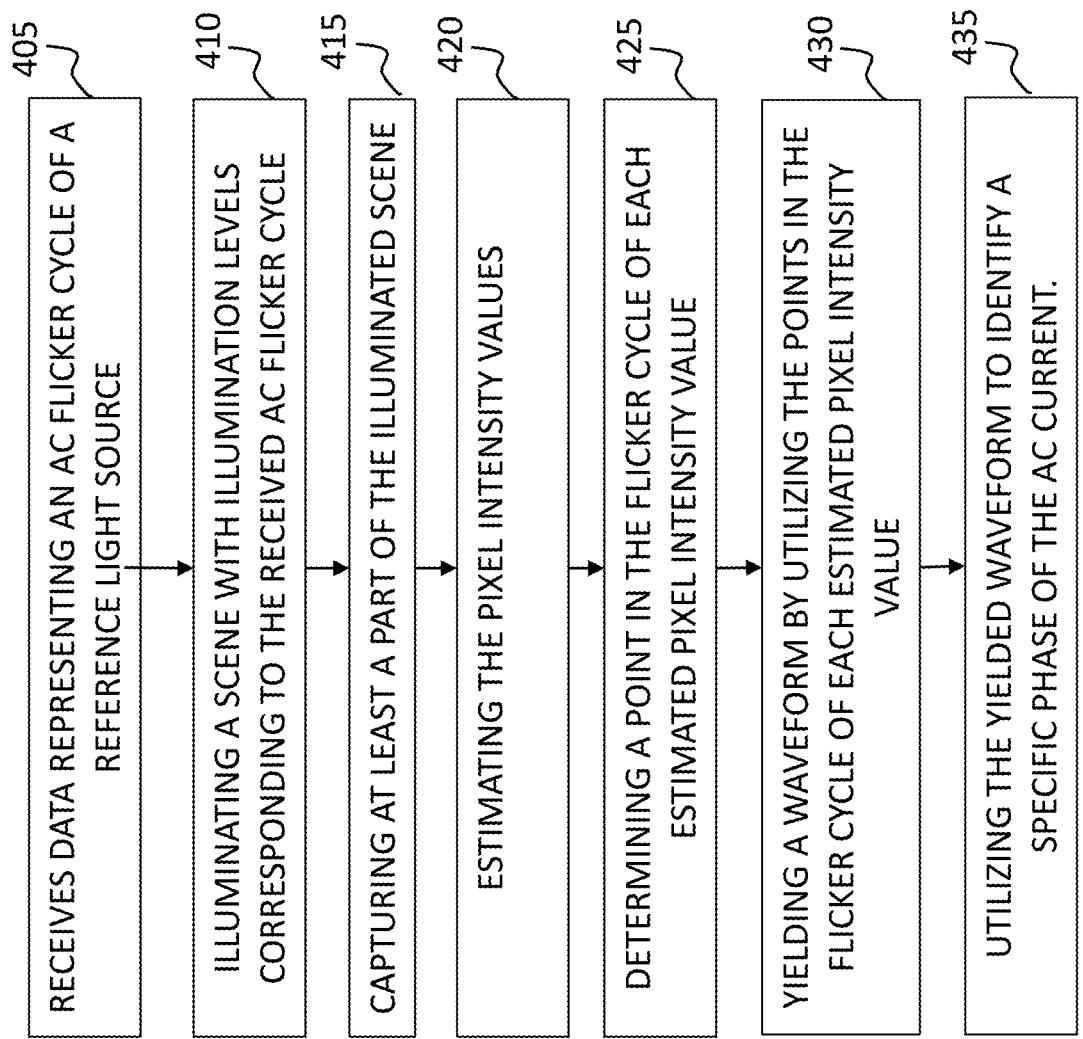
FIG. 4 discloses a method utilized by a system to receive data representing a light intensity according an AC flicker cycle and identify a specific phase of the AC current which powered the reference light source, according to exemplary embodiments of the present invention.

FIG. 4 discloses a method utilized by a system to receive data representing a light intensity which corresponds to an AC flicker cycle and identify a specific phase of the AC current which powered the reference light source, according to exemplary embodiments of the present invention. At step 405 a system configured to receive digital data receives data representing light intensity which corresponds to an AC flicker cycle of a reference light source. Such a reference light source can be an AC powered light source. In some cases, such data may comprise but not limited to, (a) a flicker-independent (deflickered) image of the scene captured by a sensing device (b) recognition of the types and electric phases of the scene's reference light source (c) image regions that can be dominated by the scene's reference light (d) the canonical time of the sensed image, relative to the zero-crossing of the AC-grid voltage.

In some embodiments, a repeating module may receive the data. In some cases, such a digital data may be received from a controller, as aforementioned. In some cases, the data may be received by telecommunications network. Such a telecommunications network may be the internet, local area network, wireless-based networks, and the like.

At step 410 a repeating module can illuminate a scene with illumination levels corresponding to the received AC flicker cycle. In some cases, such a scene can comprise a diffuse surface which can be illuminated by a light source. Such a diffuse surface can be a wall reflecting light towards the imaging device.

In some embodiments, the repeating module can utilize a projector, or a controllable illumination source to encode the flicker cycle of the reference light source.

At step 415 an imaging device can capture at least part of the illuminated scene. In some cases, the imaging device can be positioned such that, at least a portion of the light reflected from a diffuse surface can be captured by the imaging device and the optical gear thereof. I such cases, the diffuse surface can be positioned to accept the illumination and reflects thereof towards the imaging device. In some cases, at step 415 a sequence of images may be captured. In some cases, rolling shutter and imaging sensor may be employed to capture one or more images of a scene that is illuminated At step 420 the imaging device estimates pixel intensity value for at least one pixel of an image corresponding to one flicker cycle, wherein the captured pixel or pixels represent an image captured by the image sensor. In some cases, the pixel or pixels utilized to estimate the pixel intensity value can be a sequence of pixels in the images captured in correspondence to one flicker cycle. In some embodiments such a sequence can be vertical or horizontal sequence of pixels corresponding to one flicker cycle.

In some embodiments, the pixels utilized to estimate the pixel intensity value can be pixels in a pixel-array in the images captured in correspondence to one flicker cycle. In such cases, the same pixels on the image sensor may be captured. In some cases, only one pixel may be captured and utilized to estimate the pixel intensity value. In such cases, one pixel can be captured in each of the images captured in correspondence to one flicker cycle.

In some embodiments, a global shutter can be utilized to expose the image sensor to the illumination reflected from the illuminated scene. In some embodiments, a rolling shutter can be utilized to expose the image sensor to the illumination reflected from the illuminated scene.

At step 425 the system can determine a temporal point in the flicker cycle of each estimated pixel intensity value in which each of the images was captured, by comparing the estimated pixel intensity values. The system can utilize the pixel intensity value. At step 430 a waveform is created according to the point in the flicker cycle of each of the images was captured. In some cases, steps 415, and step 420 may be repeated more than one time, for the purpose of receiving more images. For example, acquiring a sequence of K images of the scene corresponding to K sub-intervals of one AC flicker cycle, where an AC flicker cycle is defined as the time span between consecutive AC voltage zero crossings.

At step 430 the images captured by employing the rolling-shutter image can yield a waveform in each image and across images. In some embodiments of the present invention, the absolute time of a captured image can be translated to an in-cycle canonical time $t_k^{can} \in [0, \Delta]$, where $\Delta$ is the flicker cycle. Once the canonical times is assigned to all images, a global-shutter image of the scene at any arbitrary canonical time $t^{can}$ can be computed as shown in image sequence 325. This approach is utilized to render the scene at any arbitrary in-cycle canonical time, that had not been sampled during rolling-shutter data acquisition. This capability exploits the periodicity and regularity of flicker, which naturally suits Fourier analysis. As a result, emulated global shutter image is generated as schematically shown in image GSF.

At step 435 the waveform yielded in step 430 can be utilized for determining an electric phase of the AC current.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system comprising an imaging device comprising a light sensing element comprising an array of pixels;
   a controllable illumination source;
   at least one hardware processor; and
   a non-transitory computer-readable storage medium having stored thereon program instructions, the program instructions executable by the at least one hardware processor to:
   receive data representing light intensity values corresponding to a flicker pattern of a reference light source powered by an alternating current (AC) of an AC grid;
   operate said controllable illumination source, based on said data, to replicate said flicker pattern of said reference light source;
   capture, using said imaging device, a sequence of images of a scene illuminated by one or more light sources attached to the AC grid, and a diffuse surface, illuminated at least in part, by said controllable illumination sourced;
   calculate an intensity value for at least one specified pixel in said array in each of said images in said sequence of images, to estimate a temporal response of a specific light source of the one or more light sources to the AC in relation to the flicker pattern; and
   determine one or more characteristics of said AC grid, based, at least in part, on said estimating.

2. The system of claim 1, wherein said one or more characteristics are selected from the group consisting of:
   a temporal point in said flicker pattern of said reference light source, a phase of said AC grid at the specific light source of the one or more light sources, phase changes of said AC grid at the specific light source, frequency fluctuations of said AC grid at the specific light source, amplitude of said AC grid at the specific light source, amplitude fluctuations of said AC grid at the specific light source, and nonlinearities in said AC grid at the specific light source.

3. The system of claim 1, wherein said estimating further comprises calculating relative temporal differences in said estimated intensity values of said at least one specified pixel in said sequence of images.

4. The system of claim 1, wherein said scene is located outside a direct illumination area of said reference light source.

5. The system of claim 1, wherein said light sensor further comprises an optical module located in the optical path between said light sensor and said reference light source, wherein said optical module is configured to perform at least one of: amplify said light flux, focus said light flux, and direct said light flux.

6. The system of claim 1, wherein said at least one specified pixel corresponds to a location within the diffuse surface.

7. The system of claim 1, wherein said imaging device further comprises a mask configured to expose said scene to said light sensing element in a spatially varying manner, and wherein said mask is a rolling shutter configured to expose rows of said light sensing element in a sequential manner, and said at least one specified pixel comprises a vertical or horizontal sequence of pixels.

8. The system of claim 7, wherein said mask is configured to expose regions of said light sensing element in a random manner.

9. The system of claim 1, wherein said determining comprises detecting a phase of said AC current powering said reference light source.

10. The system of claim 1, wherein the at least one hardware processor is further configured to extract different components of the image, related to different light sources of the one or more light sources, based on said estimation.

11. The system of claim 1, wherein the at least one hardware processor is further configured to:
    determine, based on said estimation, (a) a contribution of each specific light source to the total illumination in the image, thus decomposing the lighting of the scene, and (b) a chromaticity value of at least one specific light source; and
    correct a color in at least one image of the sequence of images of the scene, based on said decomposition and determined chromaticity.

12. The system of claim 1, wherein the at least one hardware processor is further configured to determine, based on said estimation, at least one of: a response function of the specific light source, a chromaticity value of the specific light source, a contribution of each specific light source to the total illumination in the image, and an electric phase of the specific light source.

13. The system of claim 1, wherein the at least one hardware processor is further configured to:
    determine, based on said estimation, a contribution of each specific light source to the total illumination in the image, thus decomposing the lighting of the scene; and
    create at least one new image of the scene, each image simulating an appearance of the scene under illumination by not all of the at least one of the one or more light sources, based on said decomposition.

14. A method comprising:
    operating at least one hardware processor for:
    receiving data representing light intensity values corresponding to a flicker pattern of a reference light source powered by an alternating current (AC) of an AC grid;
    operating a controllable illumination source, based on said data, to replicate said flicker pattern of said reference light source;

operating an imaging device to capture a sequence of images of a scene illuminated, by one or more light sources attached to the AC grid, and a diffuse surface, illuminated at least in part, by said controllable illumination sourced;

calculating an intensity value for at least one specified pixel in said array in each of said images in said sequence of images, to estimate a temporal response of a specific light source of the one or more light sources to the AC in relation to the flicker pattern; and determining one or more characteristics of said AC grid, based, at least in part, on said estimating.

15. The method of claim 14, wherein said one or more characteristics are selected from the group consisting of:

a temporal point in said flicker pattern of said reference light source, a phase of said AC grid at the specific light source of the one or more light sources, phase changes of said AC grid at the specific light source, frequency fluctuations of said AC grid at the specific light source, amplitude of said AC grid at the specific light source, amplitude fluctuations of said AC grid at the specific light source, and nonlinearities in said AC grid at the specific light source.

16. The method of claim 14, wherein said estimating further comprises calculating relative temporal differences in said estimated intensity values of said at least one specified pixel in said sequence of images.

17. The method of claim 14, wherein said scene is located outside a direct illumination area of said reference light source.

18. The method of claim 14, wherein said at least one specified pixel corresponds to a location within the diffuse surface.

19. A computer program product comprising a non-transitory computer-readable storage medium having program instructions embodied therewith, the program instructions executable by at least one hardware processor to:

receive data representing light intensity values corresponding to a flicker pattern of a reference light source powered by an alternating current (AC);

operate a controllable illumination source, based on said data to replicate said flicker pattern of said reference light source;

operate an imaging device to capture a sequence of images of a scene illuminated, by one or more light sources attached to the AC grid, and a diffuse surface, illuminated at least in part, by said controllable illumination source;

calculating estimate an intensity value for at least one specified pixel in said array in each of said images in said sequence of images, to estimate a temporal response of a specific light source of the one or more light sources to the AC in relation to the flicker pattern; and determine one or more characteristics of said AC grid, based, at least in part, on said estimating.

* * * * *